United States Patent
Zhou et al.

(10) Patent No.: US 10,506,638 B2
(45) Date of Patent: Dec. 10, 2019

(54) METHOD TO PRIORITIZE RANDOM ACCESS WITH PREAMBLE CODING

(71) Applicant: Huawei Technologies Duesseldorf GmbH, Duesseldorf (DE)

(72) Inventors: Chan Zhou, Munich (DE); Oemer Bulakci, Munich (DE); Josef Eichinger, Munich (DE)

(73) Assignee: HUAWEI TECHNOLOGIES DUESSELDORF GMBH, Duesseldorf (DE)

(*) Notice: Subject to any disclaimer, the term of this patent is extended or adjusted under 35 U.S.C. 154(b) by 179 days.

(21) Appl. No.: 15/612,882

(22) Filed: Jun. 2, 2017

(65) Prior Publication Data
US 2017/0273115 A1    Sep. 21, 2017

Related U.S. Application Data

(63) Continuation of application No. PCT/EP2014/076358, filed on Dec. 3, 2014.

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0053* (2013.01); *H04L 5/0091* (2013.01);
(Continued)

(58) Field of Classification Search
None
See application file for complete search history.

(56) References Cited

U.S. PATENT DOCUMENTS

| 8,934,896 B2* | 1/2015 | Zhu | H04W 72/082 |
| | | | 455/114.2 |
| 9,019,823 B1* | 4/2015 | Raparthy | H04W 28/0284 |
| | | | 370/230 |

(Continued)

FOREIGN PATENT DOCUMENTS

| EP | 1715709 A1 | 10/2006 |
| EP | 1954081 A1 | 8/2008 |

(Continued)

OTHER PUBLICATIONS

GOST 7.83-2001,International Standard—The system of standards for information, libraryand publishing—Electronic Editions—Basic views and output,dated Jul. 1, 2002,total 16 pages with 19 pages English translation.

(Continued)

*Primary Examiner* — Bob A Phunkulh
(74) *Attorney, Agent, or Firm* — Gregg Jansen

(57) ABSTRACT

A Random Access (RA) method is provided, comprising receiving, by a base station, a resource request transmitted by at least one of a plurality of terminal devices during one RA time slot, with the resource request including one or more preambles; detecting, by the base station, a priority level of the resource request based on a number of preambles in the resource request; and assigning, by the base station, uplink resources according to the resource request and the priority level.

14 Claims, 12 Drawing Sheets

(51) Int. Cl.
*H04L 5/00* (2006.01)
*H04W 72/04* (2009.01)
*H04W 72/10* (2009.01)
*H04W 28/02* (2009.01)

(52) U.S. Cl.
CPC ......... *H04W 72/042* (2013.01); *H04W 72/10* (2013.01); *H04W 28/02* (2013.01)

(56) References Cited

U.S. PATENT DOCUMENTS

| | | | |
|---|---|---|---|
| 9,426,828 B1* | 8/2016 | Singh | H04W 74/0833 |
| 9,668,279 B2 | 5/2017 | Jen et al. | |
| 2006/0126570 A1* | 6/2006 | Kim | H04J 13/0025 |
| | | | 370/335 |
| 2008/0130588 A1* | 6/2008 | Jeong | H04W 74/002 |
| | | | 370/335 |
| 2008/0225785 A1 | 9/2008 | Wang et al. | |
| 2008/0316961 A1* | 12/2008 | Bertrand | H04W 74/004 |
| | | | 370/329 |
| 2010/0080135 A1* | 4/2010 | Ishii | H04B 7/2637 |
| | | | 370/252 |
| 2010/0255867 A1* | 10/2010 | Ishii | H04J 11/0023 |
| | | | 455/501 |
| 2012/0082120 A1* | 4/2012 | Chun | H04L 5/0053 |
| | | | 370/329 |
| 2013/0242730 A1* | 9/2013 | Pelletier | H04W 28/0284 |
| | | | 370/230 |
| 2013/0301541 A1* | 11/2013 | Mukherjee | H04W 74/0833 |
| | | | 370/329 |
| 2014/0079011 A1* | 3/2014 | Wiberg | H04W 74/006 |
| | | | 370/329 |
| 2014/0153417 A1* | 6/2014 | Gupta | H04W 52/0219 |
| | | | 370/252 |
| 2014/0177525 A1 | 6/2014 | Aydin et al. | |
| 2014/0349712 A1* | 11/2014 | Shukla | H04W 74/0833 |
| | | | 455/561 |
| 2016/0057688 A1* | 2/2016 | Koskinen | H04W 48/16 |
| | | | 370/332 |
| 2016/0278127 A1* | 9/2016 | Sunell | H04W 74/0833 |
| 2016/0345365 A1 | 11/2016 | Vujcic et al. | |

FOREIGN PATENT DOCUMENTS

| | | |
|---|---|---|
| EP | 2416604 A1 | 2/2012 |
| EP | 2670206 A1 | 12/2013 |
| EP | 1949566 B1 | 4/2014 |
| JP | 2009284532 A | 12/2009 |
| JP | 2011166831 A | 8/2011 |
| JP | 2012511278 A | 5/2012 |
| JP | 2013545324 A | 12/2013 |
| KR | 20080086415 A | 9/2008 |
| RU | 2429567 C2 | 9/2011 |
| WO | 2010064968 A1 | 6/2010 |
| WO | 2013013697 A1 | 1/2013 |

OTHER PUBLICATIONS

IEEE Std 802.11™-2012, IEEE Standard for Information technology—Telecommunications and information exchange between systems; Local and metropolitan area networks—Specific requirements, Part 11: Wireless LAN Medium Access Control (MAC) and Physical Layer (PHY) Specifications, Mar. 29, 2012. total 2793 pages.
3GPP, TR 23.888, "3rd Generation Partnership Project; Technical Specification Group Services and System Aspects; System improvements for Machine-Type Communications (MTC) (Release 11)," V11.0.0, Sep. 2012. total 165 pages.
3GPP, TS 36.331, "Evolved Universal Terrestrial Radio Access (E-UTRA); Radio Resource Control (RRC); Protocol specification", V10.1.0, Mar. 2011. total 290 pages.
3GPP, TR 37.868, "Study on RAN Improvement for Machine-Type Communication", V11.0.0, Sep. 2011. total 28 pages.
Y. Liu et al., "Design of a scalable hybrid MAC protocol for heterogeneous M2M networks" IEEE Internet of Things Journal, vol. 1, No. 1, Feb. 2014. pp. 99-111.
Tarik Taleb and Andreas Kunz, "Machine type communications in 3GPP networks: potential, challenges, and solutions", IEEE Communications Magazine, Bd. 50, Nr. 3, Mar. 2012. pp. 178-184.
I. Rhee et al., "Z-MAC: A hybrid MAC for wireless sensor networks" IEEE/ACM Transactions on Networking, vol. 16, No. 3, Jun. 2008. pp. 511-524.
H. Thomsen et al., "Code-expanded radio access protocol for machine-to-machine communications," Trans. Emerging Tel. Tech. 24:355-65 (2013). Total 12 pages.

\* cited by examiner

METHOD TO PRIORITIZE RANDOM ACCESS WITH PREAMBLE CODING

CROSS-REFERENCE TO RELATED APPLICATIONS

This application is a continuation of International Application No. PCT/EP2014/076358, filed on Dec. 3, 2014, the disclosure of which is hereby incorporated by reference in its entirety.

TECHNICAL FIELD

The present disclosure relates to a Random Access (RA) method, and to a base station, a terminal device and a system, respectively, which are each configured to participate in the RA method.

BACKGROUND

Future mobile and wireless communication networks will support a variety of services. Particular services, such as services enabling traffic safety applications, have extremely strict latency requirements. A response time for a terminal device using such a delay-sensitive service, i.e. the time period from the time point, at which a terminal device initiates a transmission to the base station, until the time point, at which the transmission is received at the base station, and is optionally confirmed by an application server, needs to be a short time period, e.g. in the order of milliseconds. Within this short time period, the network should accomplish the whole uplink transmission procedure.

Due to its unpredictable nature, an uplink transmission procedure is typically a RA procedure, in which resource allocation to transmitters, for example terminal devices, cannot be coordinated in advance. In case that more than one terminal device employs the same uplink resource at the same RA time slot for a transmission to the base station, a collision occurs. This collision usually results in interference such that some or all of the colliding transmissions cannot be decoded correctly. As a consequence, the affected transmission has to be repeated, which leads to additional delay in the procedure.

For the aforementioned delay-sensitive services, the delay caused by a collision can be the most critical issue. The latency of a RA channel in the 3GPP Long Term Evolution (LTE) network often exceeds 100 ms (see e.g. 3GPP, TR 37.868, "*Study on RAN Improvement for Machine-Type Communication*", V 11.0.0, September 2011), which is far beyond the actual response time requirements for most delay-sensitive services, e.g., traffic safety services. Additionally, when a Machine Type Communication (MTC) is introduced into the network, the number of terminal devices, which may simultaneously access the network, e.g. the base station, will sharply increase. Consequently, the probability of collisions during the RA procedure increases further, and the above-described latency issue becomes even worse.

Since future wireless networks, e.g., LTE new Releases and Fifth Generation 5G, will also be more versatile, a mixture of delay-sensitive service traffic and delay-tolerant service traffic will increasingly coexist in the radio channels. In view of the above-described collision and delay issues, the RA procedure will thus need to employ some prioritization of the different kinds of service traffic. For instance, in case that a resource request for a delay-sensitive service collides with a resource request for a delay-tolerant service, a higher priority should be granted to the delay-sensitive resource request, so that a retransmission of the delay-sensitive resource request is avoided.

In the conventional Carrier Sense Multiple Access (CSMA) scheme, a transmitting terminal device senses and detects signals from other terminal devices before it starts its actual transmission. The time period, in which the terminal device senses, whether the channel is free, is called a contention window for colliding devices. The priority in this scheme can be implemented by adjusting the contention window size such that specific terminal devices are given earlier chances to transmit than others (see Y. Liu et al., "*Design of a scalable hybrid mac protocol for heterogeneous m2m networks*" IEEE Internet of Things Journal, Bd. 1, Nr. 1, p. 99-111, 2014 or I. Rhee et al. "*Z-MAC: A hybrid MAC for wireless sensor networks*" IEEE Transaction for Network, Bd. 16, Nr. 3, p. 511-524, 2008). The CSMA scheme bases on the assumption that one terminal device can detect the signal from other terminal devices in advance. This is a practical limitation, particularly in a cellular network with a cell radius over several hundred meters. That is to say, in order to be able to detect other terminal devices, the terminal devices have to be located close to each other. Otherwise, the CSMA scheme will suffer from the so called "hidden node problem" as known from WLAN.

Therefore, in LTE (see 3GPP, TS 36.331, "*Evolved Universal Terrestrial Radio Access (E-UTRA); Radio Resource Control (RRC); Protocol specification*", V. 10.1.0, March 2011), preambles are used in the RA procedure. As shown in FIG. 1, in a conventional RA procedure 100, a first terminal device 102 and a second terminal device 103 (denoted as UE1 and UE2, respectively, in FIG. 1) each transmit a preamble as a resource request in advance of their actual transmission to a base station 101 (denoted as BS), in order to request a dedicated uplink resource, specifically a time-frequency resource block, from the base station 101.

In particular, once a terminal device 102, 103 in LTE has an unscheduled transmission request, it will start the RA procedure 100 to communicate a resource request for its initial network access. As shown in FIG. 1, the RA procedure 100 comprises four steps.

In a first step, one or more terminal devices 102, 103 transmit a resource request with a randomly selected RA preamble to the base station 101. For instance, as shown in FIG. 1, the two terminal devices UE1 and UE2 each transmit a preamble defined by a signature PA1. A set of all possible preambles is known at the terminal devices 102, 103 and at the base station 101. Therefore, the preamble can also be used as a training sequence and as a signature. The base station 101 can detect different preambles, and can send responses according to individual preambles. In the case of FIG. 1, the base station 101 detects a resource request with the preamble PA1.

In a second step, the base station 101 transmits a RA response in the downlink shared channel in response to the detected preambles. According to the detected preamble of each resource request, the base station 101 assigns an uplink resource to the corresponding terminal device(s) 102, 103. In the case of FIG. 1 the base station 101 grants uplink (UL) resource for the terminal devices UE1 and UE2 sending the preamble PA1.

In a third step, a terminal device 102, 103 transmits its identity and other messages, e.g., scheduling request, to the base station 101 using the resource assigned to it by the base station 101 in the RA response in the second step. In the case of FIG. 1, both UE1 and UE2 recognize that UL resources are granted according to their resource request, and thus both UE1 and UE2 send a message in the granted UL resource.

In a fourth step, the base station 101 echoes the identity of the terminal device(s) 102, 103 it received in the third step.

In a case that—as shown in FIG. 1—two terminal devices 102, 103 choose the same preamble (denoted with PA1 in FIG. 1) for their resource request, the base station 101 cannot distinguish the resource requests from different terminal devices 102, 103. Hence, the same uplink resource will be assigned to both terminal devices 102, 103. In this case, in the third step both terminal devices 102, 103 use the same resource for their actual transmission, and thus a collision occurs. In this collision case, if a transmission sent in the third step cannot be decoded correctly, the corresponding terminal device 102 or 103 will not receive the confirmation from the base station 101 in the fourth step. Thus, it must reinitialize its preamble transmission after a certain time, the so called back-off time.

It can thus be seen that in the above-described first round of the RA procedure 100 shown in FIG. 1, delay-sensitive resource requests do not have any advantage over delay-tolerant resource requests. Only during the retransmission of the preamble, delay-sensitive resource requests may be granted with a shorter back-off time compared to delay-tolerant requests.

In particular, for the RA procedure 100 shown in FIG. 1, a prioritization was proposed via certain back-off schemes (see 3GPP, TR 37.868, "*Study on RAN Improvement for Machine-Type Communication*", V 11.0.0, September 2011, and Tarik Taleb and Andreas Kunz, "*Machine type communications in 3GPP networks: potential, challenges, and solutions*", IEEE Communications Magazine, Bd. 50, Nr. 3, p. 178-184, 2012. 2012). In these schemes, high-priority terminal devices are assigned a shorter back-off time than low-priority terminal devices. However, as short as the back-off time may be, at least one retransmission is inevitable in case of a collision.

In order to further reduce the potential latency for emergent and delay-sensitive services, LTE also applies a contention-free scheme for RA channel. In this contention-free scheme, particular preambles are reserved only for delay-sensitive services. That is, certain terminal devices are assigned exclusive preambles, which are not shared with other terminal devices. Because the reserved preambles are exclusively used for the specified delay-sensitive services, the collision probability is reduced or even eliminated. However, the number of preambles in a network is typically limited. Further, the reservation of dedicated preambles even reduces the total number of available preambles used for other contention-based accesses. Thus, on the one hand side, if more preambles are reserved for contention-free access, the efficiency of the preamble usage of the contention-based accesses becomes worse. On the other hand side, there may also not be sufficient preambles for all the contention-free accesses of delay-sensitive services.

In addition to the above-described problems of collision and delay, there may also be the problem that the number of required resources to support the terminal devices, which request resources, exceeds the number of available resources that the base station 101 is able to provide. Also in this case, delay-sensitive resource requests do not have any advantage over delay-tolerant resource requests.

SUMMARY

A Random Access (RA) method is provided, including receiving, by a base station, a resource request transmitted by at least one of a plurality of terminal devices during one RA time slot, with the resource request including one or more preambles, detecting, by the base station, a priority level of the resource request based on a number of preambles in the resource request, and assigning, by the base station, uplink resources according to the resource request and the priority level.

A base station is provided, including a receiver configured to receive a resource request from at least one of a plurality of terminal devices during one Random Access (RA) time slot, with the resource request including one or more preambles, a memory storage comprising instructions, and a processor in communication with the memory and with the receiver. The processor executes the instructions to detect a priority level of the resource request based on a number of preambles in the resource request, and assign uplink resources according to the resource request and the priority level.

A terminal device is provided, including a transmitter configured to transmit a resource request with one or more preambles to a base station during one Random Access (RA) time slot, a memory storage comprising instructions, and a processor in communication with the memory and with the transmitter. The processor executes the instructions to combine more preambles for transmitting a resource request having a higher priority level or combine fewer preambles for transmitting a resource request having a lower priority level.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be fully formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of specific embodiments in relation to the enclosed drawings, in which.

DETAILED DESCRIPTION OF EMBODIMENTS

The present disclosure relates to a Random Access (RA) method, and to a base station, a terminal device and a system, respectively, which are each configured to participate in the RA method. In particular, the RA method of the present disclosure introduces prioritization to an assignment of uplink resources in a wireless network by determining priority levels of resource requests. The RA method of the present disclosure can be applied to communication services with different levels of latency requirements and service priorities, specifically to services of machine type communications, but also services of human-centric communications.

The present disclosure provides a more effective and flexible RA scheme. In particular, the present disclosure reduces transmission delays, specifically for terminal devices sending delay-sensitive resource requests. Thus, the present disclosure provides a RA scheme to better handle simultaneous resource requests and to resolve collisions during actual transmissions of multiple terminal devices. Further, the present disclosure seeks to avoid that terminal devices, which send delay-sensitive resource requests, do not receive any resources in case that resources are insufficient. Therefore, the RA scheme of the present disclosure generally provides different priorities to delay-sensitive resource requests and delay-tolerant resource requests. In addition, in the RA scheme of the present disclosure, priorities are assigned in a manner that is user/terminal device-specific, or application/service specific.

Figure 2:
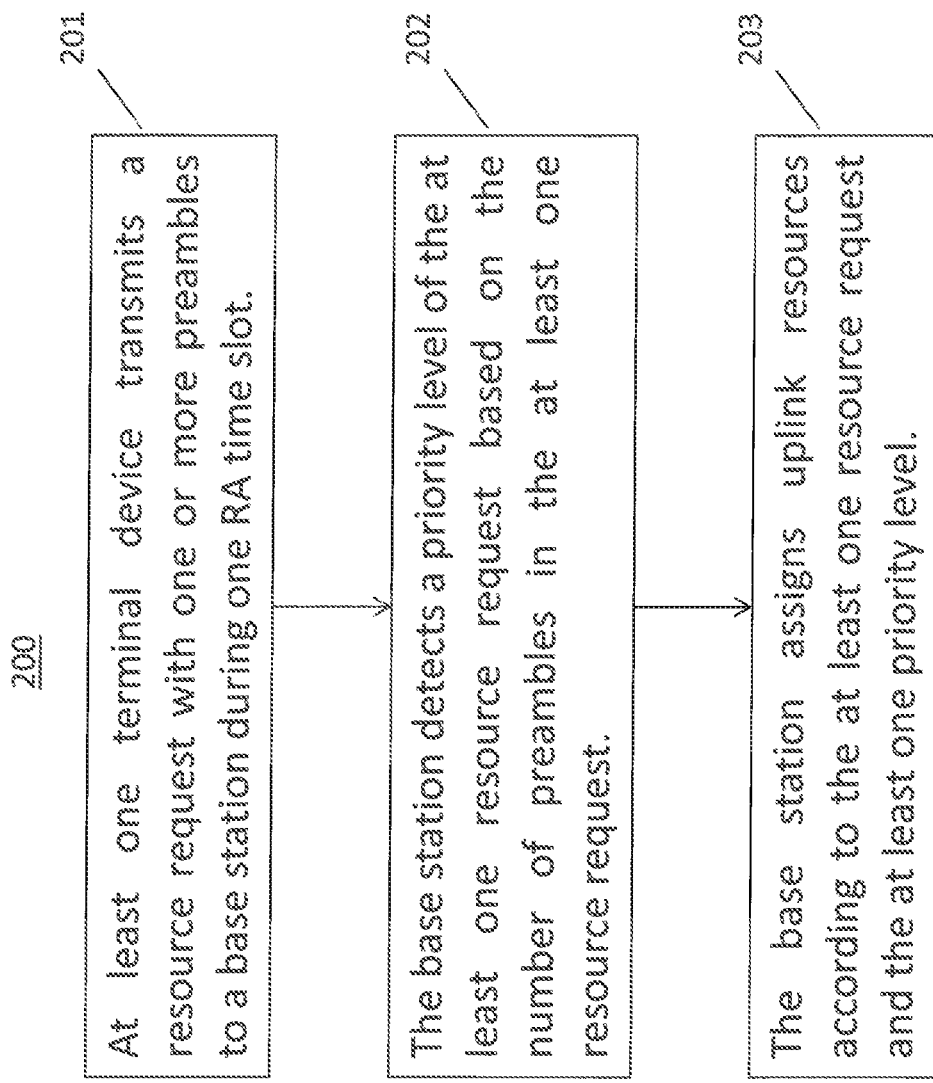
FIG. 2 shows a RA method according to an embodiment of the present disclosure.

FIG. 2 shows an embodiment of a RA method 200 proposed by the present disclosure. In a first step 201 of the method 200, at least one terminal device transmits a resource request with one or more preambles to a base station during one RA time slot. In a second step 202 of the method 200, the base station detects a priority level of the at least one received resource request based on the number of preambles included in the at least one resource request. In a third step 203 of the method 200, the base station assigns uplink resources according to the at least one received resource request and the respectively detected at least one priority level. If two or more received resource requests have at least one preamble in common, the base station assigns uplink resources according to the resource request, among these determined resource requests with least one common preamble, which has the highest priority level. For resource requests not having any preamble in common, the base station sequentially assigns uplink resources according to, firstly, the resource request having the highest priority level to, lastly, the resource having the lowest priority level. If not enough resources are available to satisfy all resource requests, the base station sequentially assigns all available uplink resources according to, firstly, the resource request having the highest priority level to, lastly, a certain resource request having a lower priority level.

Figure 3:
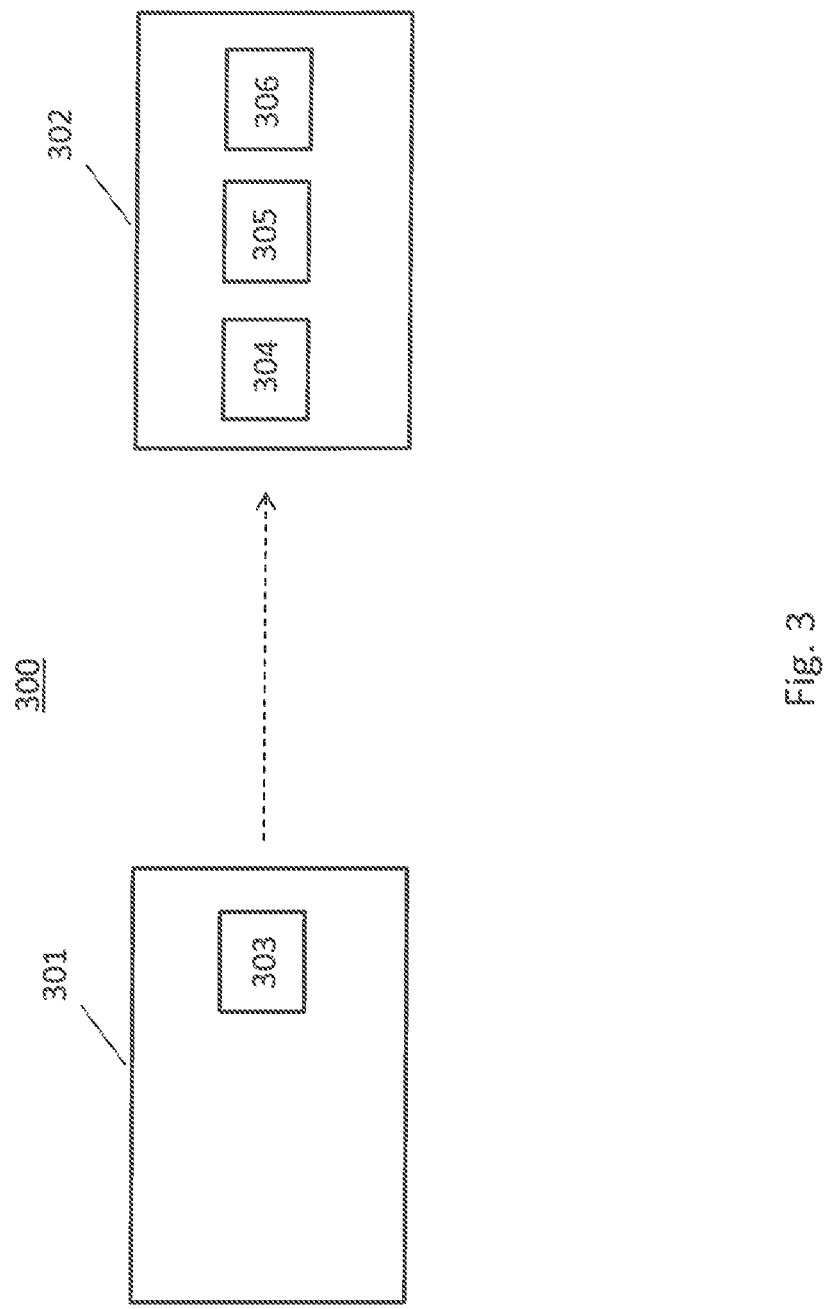
FIG. 3 shows a system including a terminal device and a base station according to an embodiment of the present disclosure.

FIG. 3 shows an embodiment of a system 300 including at least one terminal device 301 and a base station 302 as proposed by the present disclosure. The system 300 is configured to perform the RA method 200 described in FIG. 2.

To this end, the terminal device 301 preferably includes a transmitting unit 303 configured to transmit (indicated by the dotted arrow) a resource request with one or more preambles to the base station 302 during one RA time slot, and is configured to combine more preambles for transmitting a resource request having a higher priority level and is configured to combine fewer preambles for transmitting a resource request having a lower priority level.

Accordingly, the base station 302 preferably includes a receiving unit 304 configured to receive from at least one terminal device 301 a resource request (indicated by the dotted arrow) with one or more preambles during the RA time slot. Further, the base station 302 preferably includes a detecting unit 305 configured to detect a priority level of the at least one received resource request based on the number of preambles in the at least one resource request. Finally, the base station 302 preferably includes an assignment unit 306 configured to assign uplink resources according to the at least one received resource request and the at least one detected priority level.

In the RA method 200 of the present disclosure, multiple terminal devices 301 may use a shared wireless medium without coordination and scheduling in advance, e.g. a physical random access channel (PRACH) in LTE. Before a terminal device 301 transmits actual data, it firstly sends the resource request with the at least one preamble in a common radio channel.

Sequences can thereby be applied as the preamble signature (as described by J. D. C. Chu, "*Polyphase Codes with Good Periodic Correlation Properties*" IEEE Trans. on, Bd. 18, p. 531-532, 1972 or R. Frank et al., "*Phase Shift Pulse Codes With Good Periodic Correlation*" IEEE Trans. on Information Theory, Bd. 8, p. 381-382, 1962.). Such sequences have nice properties in sense of autocorrelation and cross-correlation.

The periodic autocorrelation is defined as $$\rho_{ff}(\tau) = \Sigma_{t=0}^{T-1} f(t)\bar{f}(t+\tau),$$

wherein f(t) is a periodic extension of the sequence with the property $f(t)=f(t+nT)$, $n \in Z$. T is the length of the sequence, Z is the set of the integers and $\bar{f}$ represents the complex conjugate of f.

The cyclic cross-correlation of two sequences is defined as $$\rho_{fg}(\tau) = \Sigma_{t=0}^{T-1} f(t)\bar{g}(t+\tau),$$

wherein f(t) is the periodic extension of a first sequence as described above, g(t) is likewise a periodic extension of a second sequence, and $\bar{g}$ is the complex conjugate of g.

The periodic autocorrelation of the preamble sequence has a single peak at zero time lag $\tau=0$ and a very low value at non-zero time lag $\tau \neq 0$. In the case of the sequences described by the above-cited paper of Chu et al., the periodic autocorrelation is a Dirac delta function, and it is exactly zero at non-zero lag. The absolute value of the cyclic cross-correlation function between two different sequences is very low. The receiving unit 304 of the base station 302 can preferably utilize the above properties of autocorrelation and cross-correlation, in order to detect individual preamble signatures, even if the preamble signatures overlap in the frequency and/or time domain.

In general, in the RA method 200 of the present disclosure, a higher prioritized terminal device 301, i.e. a terminal device 301 sending a resource request with a higher priority level, uses for the resource request a combination of more preambles, i.e. combines more preamble signatures, in a certain RA time slot, than a lower prioritized terminal device 301, which sends a resource request with a lower priority level, and thus with fewer preambles. In other words, a terminal device 301 combines more preambles for transmitting a resource request having a higher priority level or fewer preambles for transmitting a resource request having a lower priority level. If resource requests have one or more preambles in common, the resource request of highest priority level "overwrites" the resource requests of lower priority level.

Figure 4:
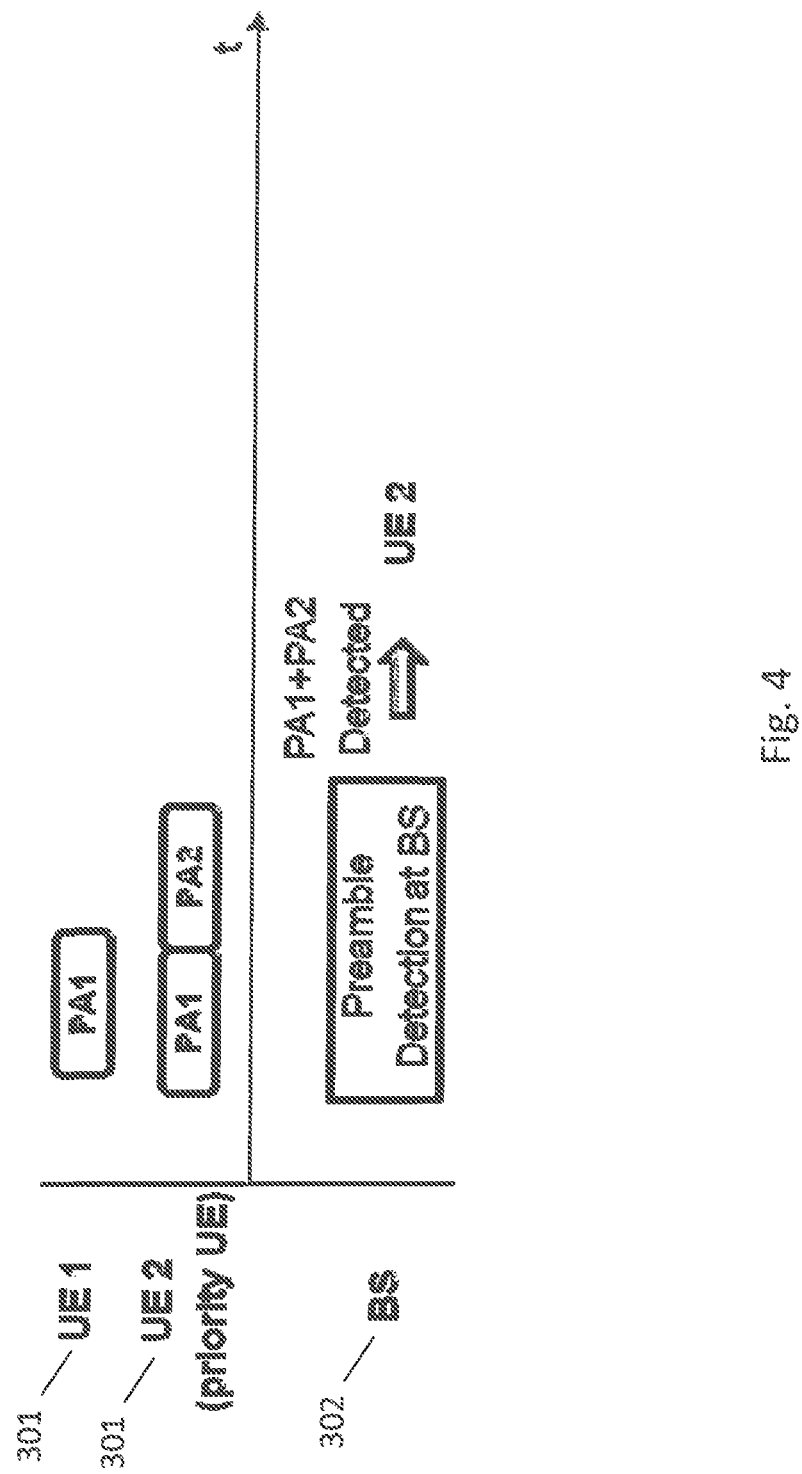
FIG. 4 shows preamble combinations for prioritizing resource requests in a RA method according to an embodiment of the present disclosure.

FIG. 4 shows a specific example for preamble combinations of resource requests of different priority levels in the RA method 200 according to the embodiment of the present disclosure. In particular, FIG. 4 shows a time (t) axis. Above the time axis is shown time-dependently, how two terminal devices 301 (referred to as UE1 and UE2) each send a resource request with preambles in a certain RA time slot to the base station, BS, 302. Below the time axis is shown time-dependently, how in the same RA time slot the base station 302 detects the sent and received preambles.

Specifically, UE1 and UE2 have a different priority. The higher priority UE2 (called "priority UE" in FIG. 4) transmits, after another in a time direction, two preambles, which are defined by preamble signatures PA1 and PA2, respectively, in the same RA time slot (the preambles are referred to in the following as preamble PA1 and PA2). Meanwhile, the lower priority UE1 sends only one preamble, which is defined by the preamble signature PA1, in the same channel in the same RA time slot. That means the resource requests of UE1 and UE2 have one preamble in common, namely the preamble PA1.

Figure 5:
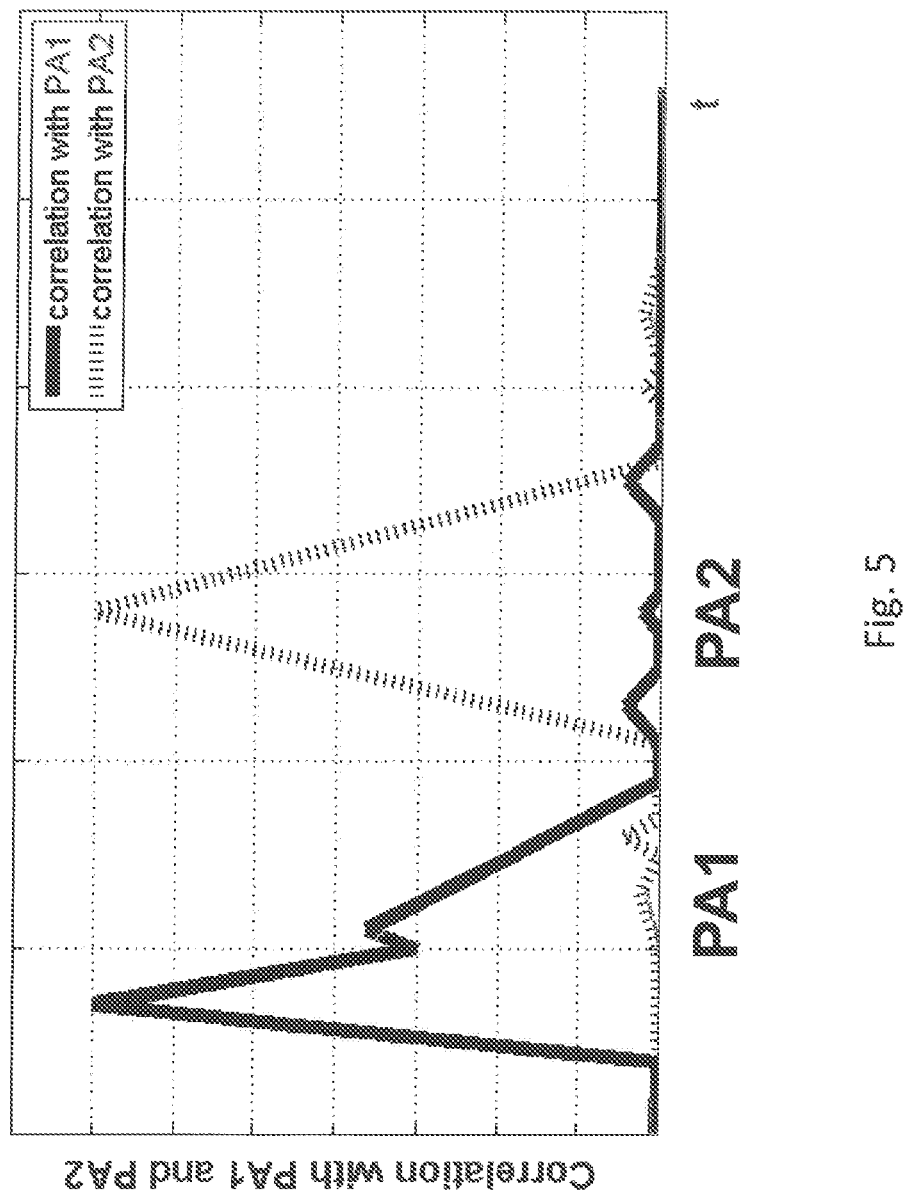
FIG. 5 shows preamble detection at the base station in a RA method according to an embodiment of the present disclosure.

While the preambles PA1 and PA2 are transmitted by UE1 and UE2, respectively, the base station 302 performs preamble detection, preferably with its detecting unit 305, i.e. in the same RA time slot. FIG. 5 shows specifically the preamble detection at the base station 302. In particular, FIG. 5 shows on a time axis (t) curves indicating a correlation of the received signal with preambles PA1 and PA2, respectively. As can be seen, correlation peaks with preamble PA1 (twice, since both UE1 and UE2 send PA1) and with preamble PA2 can be well detected and distinguished at the base station 302, respectively. Hence, as also indicated in FIG. 4, the base station 302 detects the preambles PA1 and PA2, and identifies the combination of PA1+PA2 from UE2 as a higher priority level resource request than a resource request with a single preamble.

According to the RA method 200 of the present disclosure, for the special case shown in FIG. 4, i.e. for at least two resource requests having at least one preamble in common, uplink resources will be granted by the base station 302 according to the resource request including the preamble combination PA1+PA2, i.e. to the terminal device UE2. Terminal device UE1 does not receive uplink resources, and needs to enter back-off and retransmission procedure. If, however, UE1 would send a preamble PA3 instead of preamble PA1, then the base station 302 would assign uplink resources firstly according to the resource request including the preambles PA1+PA2, i.e. to the terminal device UE2, and secondly according to the resource request including preamble PA3, i.e. to the terminal device UE1, given that uplink resources are still available. In this case the terminal device UE1 does not have to enter a back-off and retransmission procedure.

Figure 6:
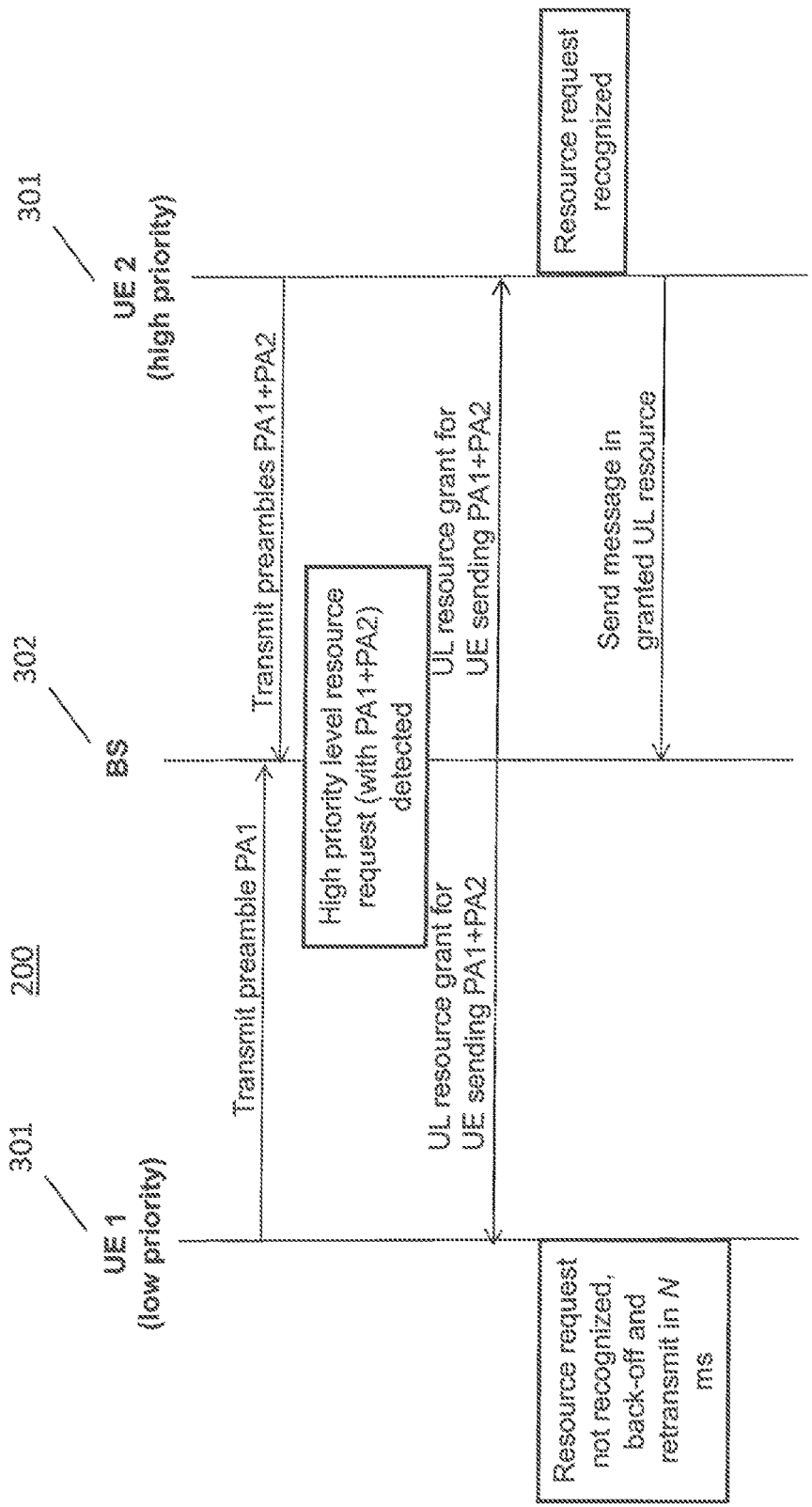
FIG. 6 shows a RA method according to an embodiment of the present disclosure.

FIG. 6 shows a RA method 200 according to an embodiment of the present disclosure, which bases on the embodiment shown in FIG. 2. In particular, FIG. 6 shows a RA procedure carried out between two terminal devices 301, namely UE1 and UE2 as shown in the FIGS. 4 and 5, and the base station 302. Arrows in FIG. 6 indicate information that is sent between the participating entities 301 and 302, respectively.

Figure 1:
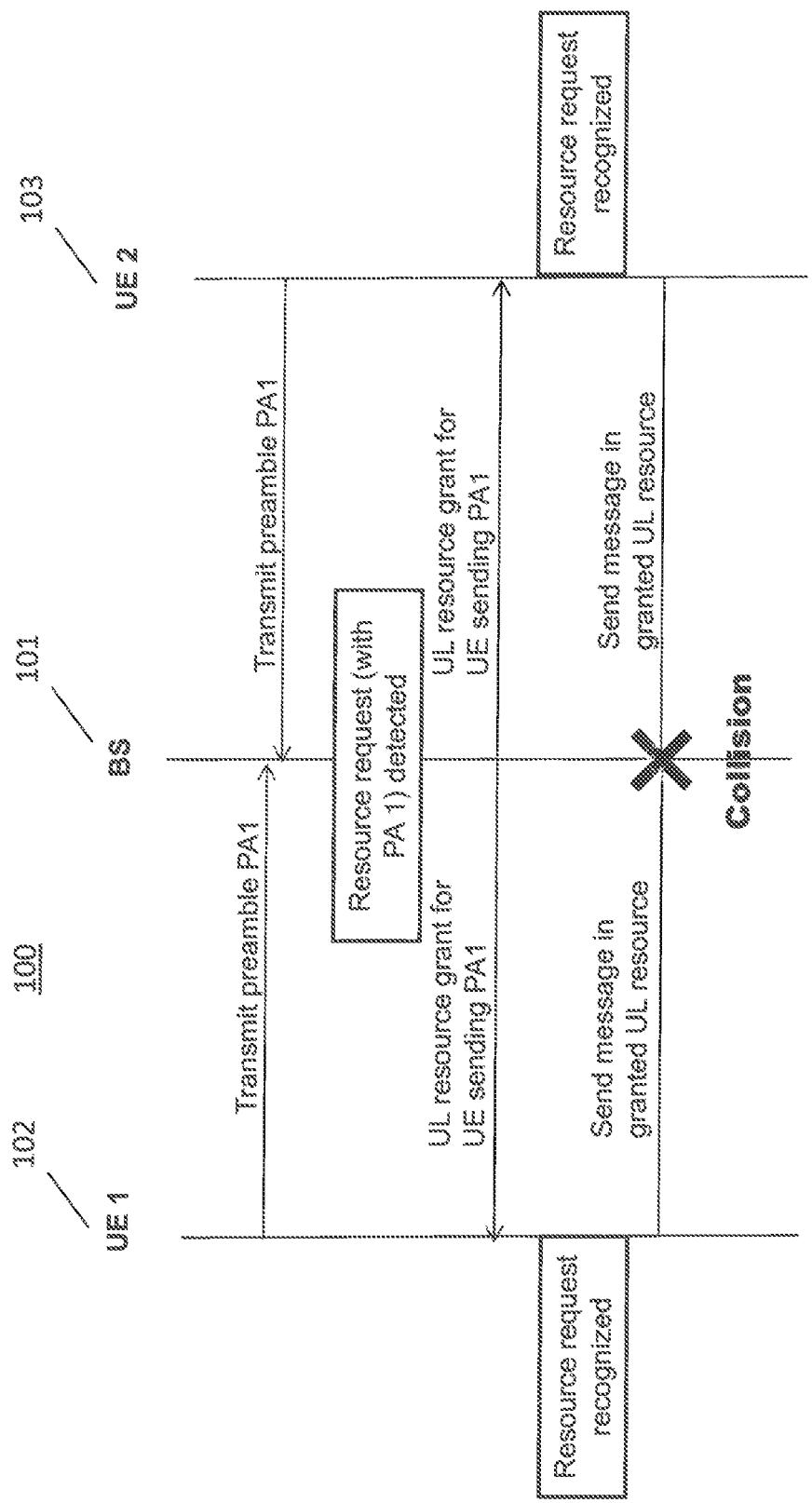
FIG. 1 shows a conventional RA procedure.

Specifically, FIG. 6 illustrates the RA method 200 for the case that two terminal devices 301 UE1 and UE2 would have a collision in the conventional RA procedure 100 as shown in FIG. 1. However, in the RA method 200 of the present disclosure, UE1 and UE2 are provided with a different priority. Therefore, in a first step, as also described with respect to FIG. 4, UE1, which is of low priority, transmits a resource request with preamble PA1, and UE2, which is of high priority, transmits a resource request with preamble combination PA1+PA2. As shown in the FIGS. 4 and 5, the base station 302 detects in a second step the high priority level resource request including the preambles PA1+PA2. In a third step, the base station 302 sends to UE1 and UE2 a grant of uplink (UL) resource according to the resource request including PA1+PA2, i.e. essentially for the UE sending PA1+PA2. In a fourth step, UE2 recognizes that uplink resources were assigned according to its resource request, and transmits its actual message in the granted UL resource. Meanwhile, UE1 does not recognize that uplink resources were assigned according to its resource request, and enters a back-off and retransmission procedure. That means, UE1 will wait a certain number of N ms, and will then retransmit its resource request to the base station 302.

Compared to the conventional RA method 100 shown in FIG. 1, the RA method 200 of the present disclosure shown in FIG. 6 guarantees the priority of particular resource requests. As a consequence, the highest priority level resource request, of all potentially colliding resource request, does not need to enter a back-off and retransmission procedure, so that the delay caused by a collision is avoided, at least for the highest priority level resource request. The more delay-sensitive a service, the higher the priority level of the resource request should be set by the terminal device 301.

Figure 7:
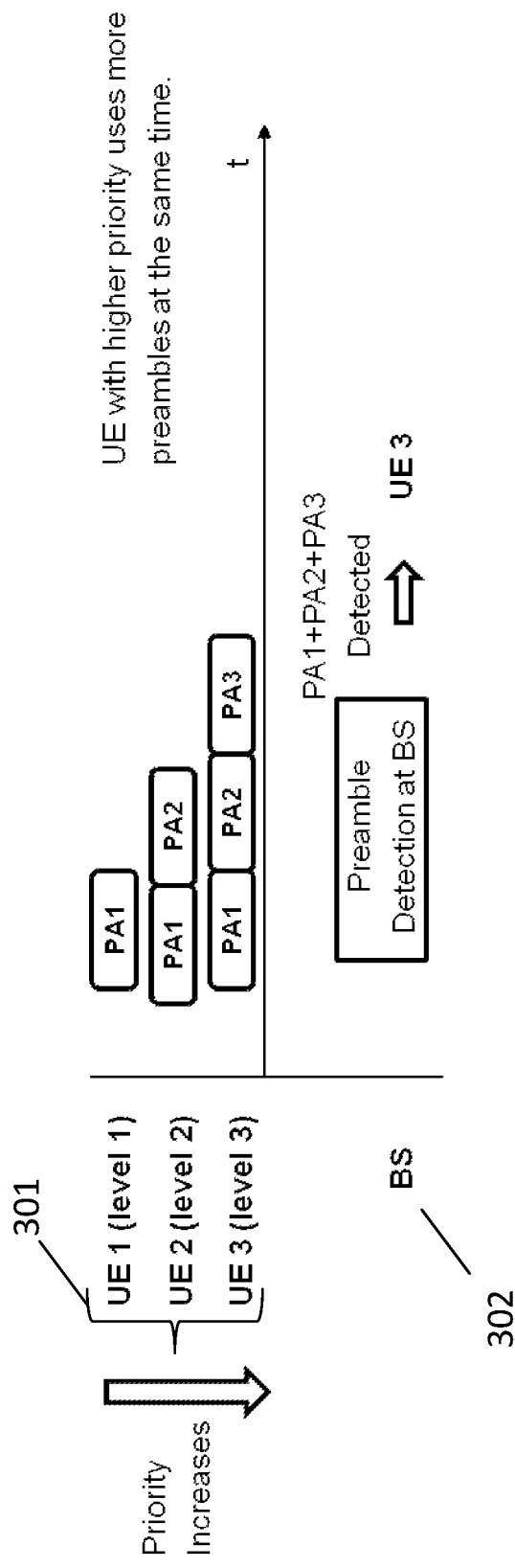
FIG. 7 shows preamble combinations for three priority levels in a RA method according to an embodiment of the present disclosure.

The proposed RA method 200 of the above described embodiments of the present disclosure also supports multiple priority levels, as shown in FIG. 7. FIG. 7 shows a further specific example for preamble combinations of resource requests of different priority level in the RA method 200. In particular, FIG. 7 shows a time (t) axis. Above the time axis is shown time-dependently, how three terminal devices 301 (referred to in the following as UE1, UE2 and UE3) each sends a resource request with preambles in a certain RA time slot to the base station, BS, 302. Below the time axis is shown time-dependently, how the base station 302 detects these preambles.

Specifically, UE1, UE2 and UE3 in FIG. 7 have three different priorities. UE3 has the highest priority (called "level 3" in FIG. 7), and uses a combination of three preambles PA1+PA2+PA3 for its resource request. UE2 has a lower priority (called "level 2" in FIG. 7) than UE3, and uses a combination of two preambles PA1+PA2 for its resource request. UE1 has the lowest priority (called "level 1" in FIG. 7), and uses one preamble PA1 for its resource request. In general, even more priorities are of course possible, and a UE 301 with a higher priority uses more preambles at the same time for its resource request than a UE 301 with a lower priority. In other words, a terminal device 301 may determine a number of preambles for transmitting a resource request with a determined priority level. To this end, the base station 302 may broadcast to one or more terminal devices 301 mapping information between numbers of preambles and priority levels of resource requests.

All resource requests shown in FIG. 7 have the preamble PA1 in common. Therefore, in order to avoid a later collision, the base station 302 assigns uplink resources only according to one of the three received resource requests. As indicated, the base station 302 detects the three preambles PA1+PA2+PA3 and identifies this resource request of highest priority level to be from UE3.

Figure 8:
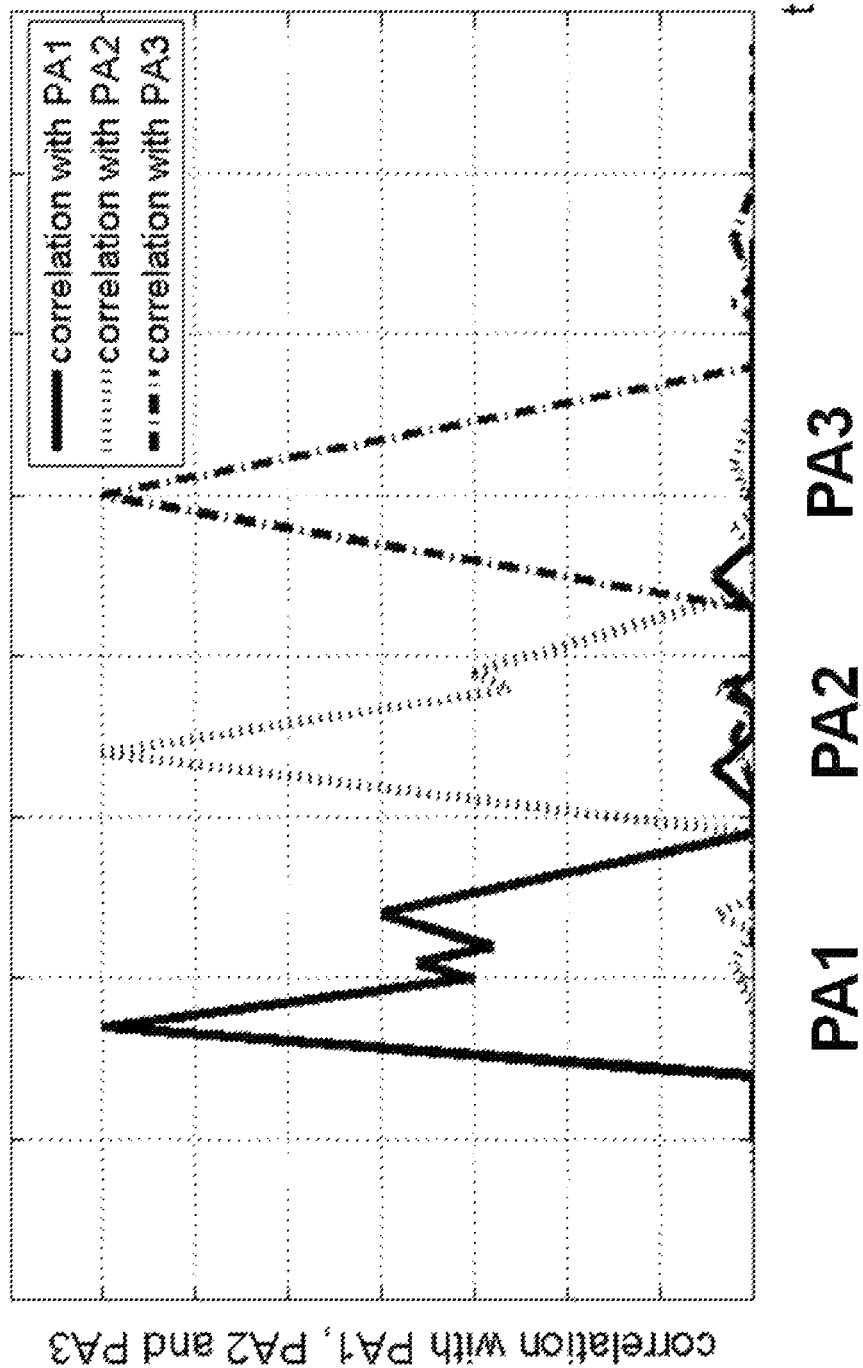
FIG. 8 shows preamble detection at the base station in a RA method according to an embodiment of the present disclosure.

In this respect, FIG. 8 shows on a time axis (t) curves indicating a correlation with the preambles PA1, PA2 and PA3, respectively. As can be seen, correlation peaks with the preamble PA1 (three times, since UE1, UE2 and UE3 send the PA1), with the preamble PA2 (twice, since UE2 and UE3 both send PA2), and with the preamble PA3 can be well detected and distinguished at the base station 302, respectively. Priority levels can be arbitrarily extended by adopting longer preamble combinations, i.e. combinations with more preambles.

In the FIGS. 4, 5, 7 and 8, preambles were sent sequentially, i.e. were arranged in a time direction. Combinations of preambles are accordingly applied in the time domain. However, combination of preambles can be applied either in the time domain or the frequency domain, or even both, as shown exemplarily in FIG. 9.

Figure 9:
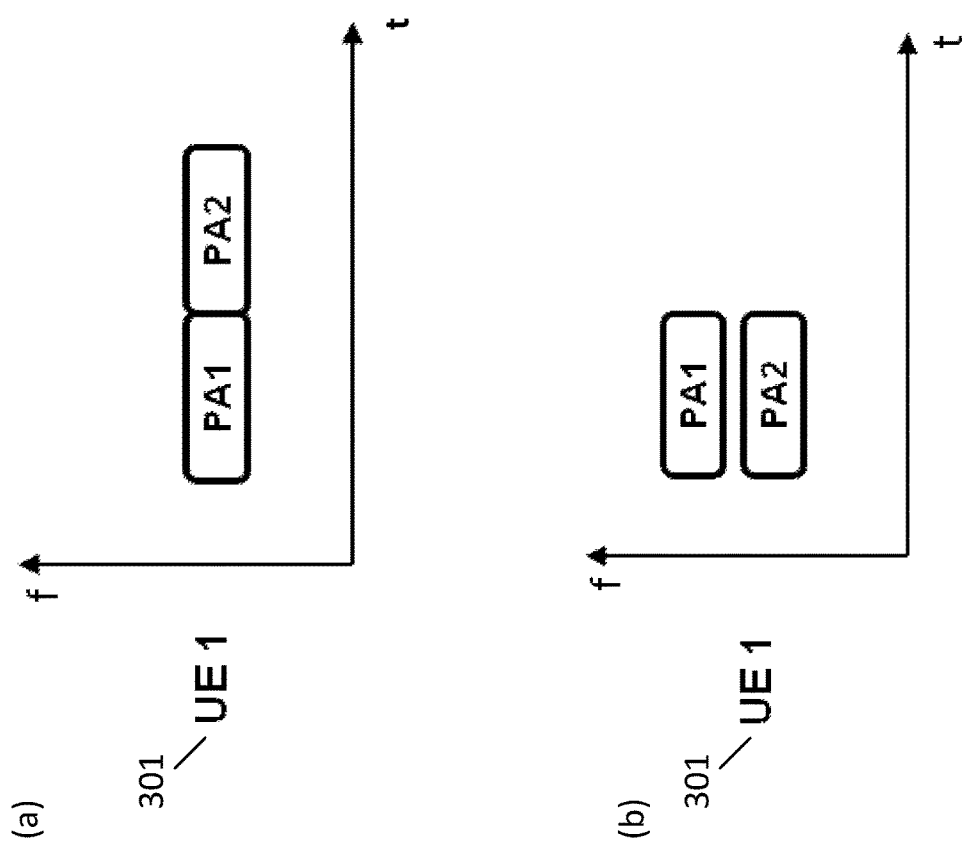
FIG. 9 shows combinations of preambles in the time domain (a) and in the frequency domain (b) in a RA method according to an embodiment of the present disclosure.

FIG. 9 shows in (a) two preambles PA1 and PA2 transmitted, by a terminal device 301 denoted as UE1, sequentially in the time domain (as indicated by the time axis t). The preambles PA1 and PA2 are, however, transmitted at the same frequency, i.e. are not separated in the frequency domain (as indicated by the frequency axis f). Likewise, FIG. 9 shows in (b) two preambles transmitted, by a terminal device 301 denoted again as UE1, sequentially in the frequency domain (as indicated by the frequency axis f), i.e. transmitted at different frequencies. The preambles PA1 and PA2 are, however, transmitted at the same time, i.e. are not separated in the time domain (as indicated by the time axis t). That means a terminal device 301 may determine and set a time and/or frequency shift between multiple preambles in one resource request.

Figure 10:
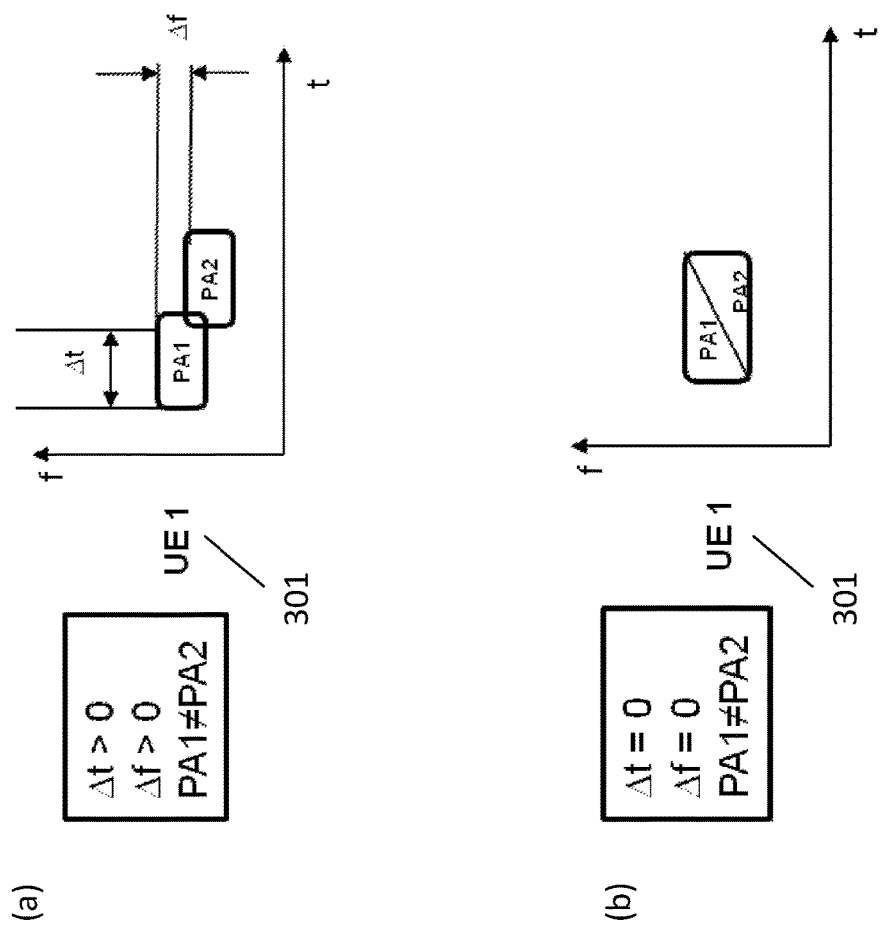
FIG. 10 shows overlapped preambles in the time domain (a) and in the frequency domain (b) in a RA method according to an embodiment of the present disclosure.

The preambles used for one preamble combination in a resource request can also overlap in the time and/or frequency domain, as shown in FIG. 10. In particular, a terminal device 301 transmitting a resource request with more than one preamble may arrange the preambles with at least a partial overlap in the time and/or frequency domain. FIG. 10 shows in (a) partially overlapped preambles PA1 and PA2 transmitted by a terminal device 301 denoted as UE1. In particular, PA1 and PA2 are separated both in the time and the frequency domain (as indicated by the time and frequency axis t and f), but also overlap in both the frequency and the time domain. Thereby, the differences $\Delta t$ and $\Delta f$ indicate determined time shift and frequency shift values, respectively, between the preambles PA1 and PA2. For example, $\Delta t$ may denote the time shift between a beginning of the first preamble PA1 and a beginning of the second preamble PA2 in the time domain, wherein "beginning in the time domain" implies earlier in time. Likewise, $\Delta f$ may denote the frequency shift between the beginnings of the preambles PA1 and PA2 in the frequency domain, respectively, wherein "beginning in the frequency domain" implies higher in frequency. However, for the time and/or frequency shifts between preambles, also different reference points may be considered. In FIG. 10 in (a), both $\Delta t$ and $\Delta f$ are larger than zero. Although in FIG. 10 in (a) the preambles are additionally defined by different signatures, i.e. by PA1≠PA2, due to the non-zero time and/or frequency shift between the preambles, also preambles defined by the same signature could be transmitted, and could still be distinguished at the base station 301.

FIG. 10 shows in (b) that two preambles PA1 and PA2, which are transmitted by a terminal device 301 denoted again as UE1, can even completely overlap, i.e. both the time shift $\Delta t$ and the frequency shift $\Delta f$ are equal to zero, and the preambles PA1 and PA2 are neither separated in the time nor the frequency domain (as indicated by the time and frequency axis t and f). In this case, the preamble signatures should not be the same, i.e. in FIG. 10 in (b) the preambles need to be defined by different signatures PA1≠PA2.

In summary, a terminal device 301, which transmits a resource request with more than one preamble, preferably provides a determined time and/or frequency shift between the preambles, and in case the determined time and/or frequency shift is zero, provides the preambles with different signatures.

The time and/or frequency shifts $\Delta t$ and $\Delta f$ can be either predetermined, or can be determined based on the current status of the network and/or the base station 302, e.g. they can depend on a current load or a predicted load in the network or at the base station 302, and/or based on the available radio resources. The time and frequency shifts may be known both at the terminal devices 301 and the base station 302, or may be communicated between the terminal devices 301 and the base station 302 in either direction. For example, the base station 302 may broadcast to the plurality of terminal devices 301 the determined time and/or frequency shift to be set between preambles of a resource request. Alternatively, a terminal device 301 may determine the frequency and/or time shift between the number of preambles, and may preferably transmit the number of preambles and/or the time and/or frequency shift to the base station 302 beforehand. The base station 302 preferably utilizes the knowledge of the time and/or frequency shifts, in order to avoid possible misdetections of resource requests.

Figure 11:
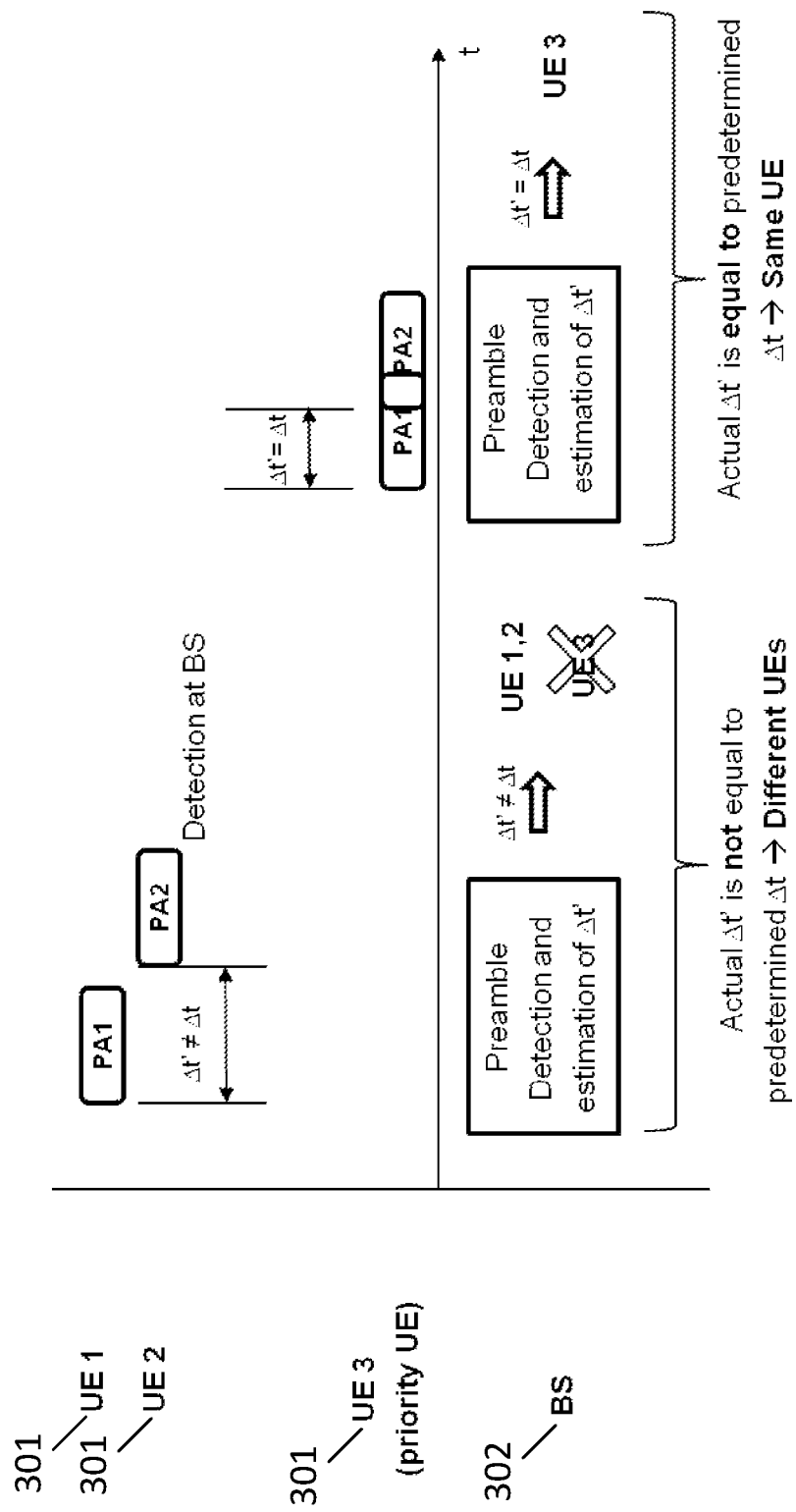
FIG. 11 shows measurements at a base station for avoiding misdetections in a RA method according to an embodiment of the present disclosure.

An approach to sieve out misdetections in the RA method 200 according to an embodiment of the present disclosure is illustrated and exemplified in FIG. 11. FIG. 11 illustrates specifically two different cases on the time axis, i.e. the cases may occur after each other. In a first case, a first terminal device 301 denoted as UE1 sends a preamble PA1, and a second terminal device 301 denoted as UE2 sends a preamble PA2 in the same RA time slot. In a second case, a third terminal device 301 denoted as UE3 with a higher priority than UE1 and UE2 sends a combination of PA1 and PA2. Since the base station 302 knows the determined time and/or frequency shift $\Delta t$ and $\Delta f$, it can distinguish between these two different cases, i.e. it can distinguish whether the preambles PA1 and PA2 are sent by two different terminal devices 301 denoted as UE1 and UE2, as in the first case, or by one higher priority terminal device 301 denoted as UE3, as in the second case.

Specifically, as shown in FIG. 11, in the first case the base station 302 detects preambles PA1 and PA2 and estimates a time shift $\Delta t'$ between the two received preambles PA1 and PA2, wherein the actual $\Delta t'$ is not equal to the predetermined time shift $\Delta t$. Therefore, the base station 302 can conclude that the two preambles PA1 and PA2 are sent by different UEs. In the second case the base station 302 detects preambles PA1 and PA2 and estimates a time shift Δt' between the two preambles PA1 and PA2, wherein the actual Δt' is equal to the predetermined time shift Δt. Therefore the base station 302 can conclude that the two preambles PA1 and PA2 are sent by the same UE. The same is of course possible for preambles sent with a frequency shift, and the base station 302 comparing an estimated frequency shift Δf' with the determined frequency shift Δf. In other words, the base station 302 may detect the time and/or frequency shift between at least two received preambles and may determine, whether the at least two received preambles are from the same terminal device 301 or from different terminal devices 301 based on the detected time and/or frequency shift and/or received power levels of preambles.

Figure 12:
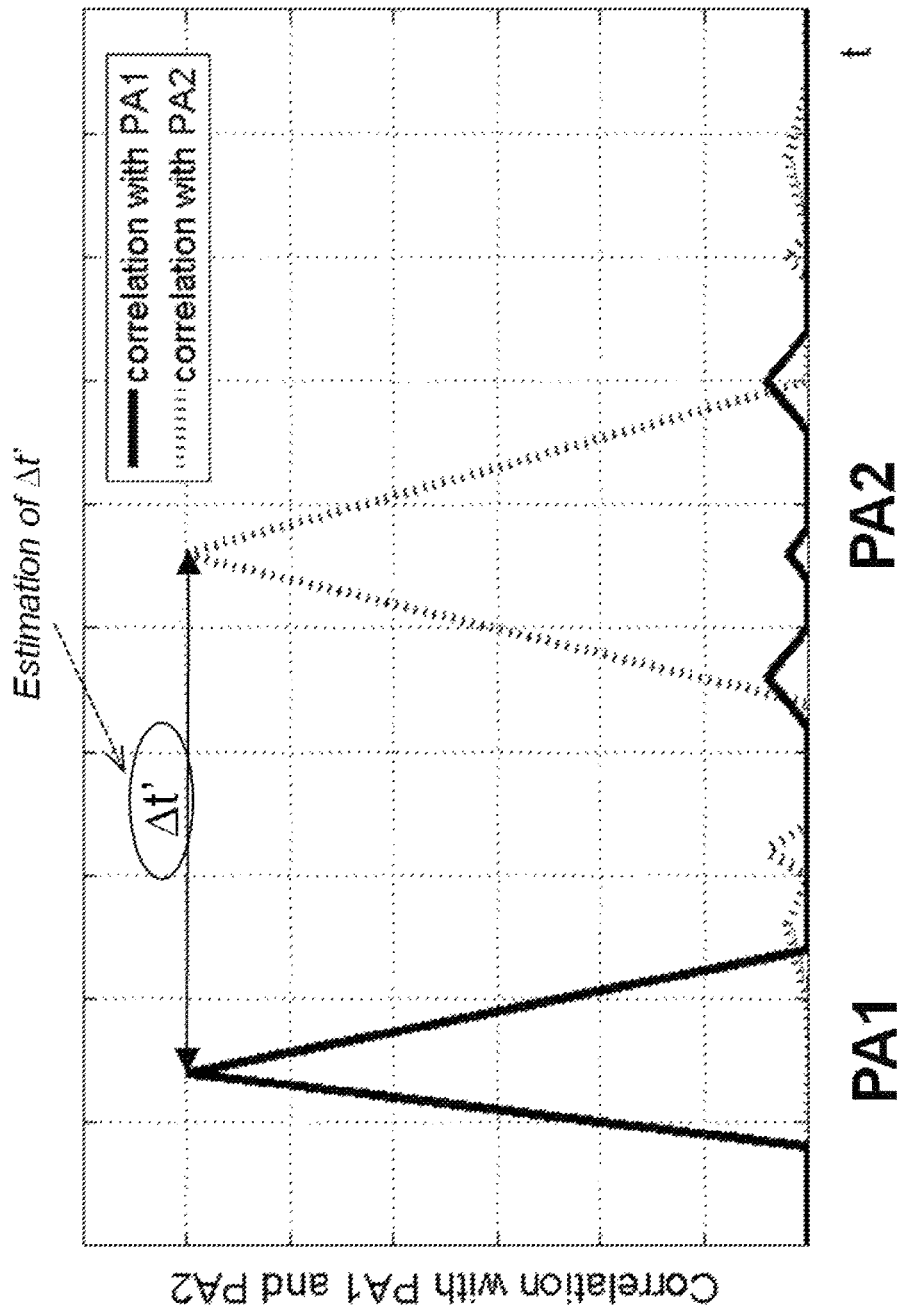
FIG. 12 shows preamble detection and estimation of a time difference at a base station in a RA method according to an embodiment of the present disclosure.

The corresponding detections of the time shift Δt' at the base station 302 are shown in FIG. 12. FIG. 12 shows on a time axis (t) curves indicating a correlation with PA1 and PA2, respectively. Δt' denotes the time shift detected by the base station 302 between the preambles PA1 and PA2, which is preferably—as illustrated—the estimated time shift between the peaks of the two correlation functions. The base station 302 can measure time and/or frequency shifts between correlation peaks of received preambles. If the estimated time shift Δt' and/or frequency shift Δf equals the determined time shift Δt and/or frequency shift Δf, the base station 302 determines that both preambles PA1 and PA2 originate from the same terminal device 301.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A Random Access (RA) method, comprising:
    receiving, by a base station, a resource request transmitted by at least one of a plurality of terminal devices during one RA time slot, with the resource request including two or more preambles;
    detecting, by the base station, a priority level of the resource request based on a number of preambles in the resource request;
    assigning, by the base station, uplink resources according to the resource request and the priority level;
    detecting, by the base station, at least one of a time or frequency shift between at least two received preambles; and
    determining, by the base station, whether the at least two received preambles are from the same terminal device or from different terminal devices based on one or more of the detected time, frequency shift, or received power levels of the at least two received preambles.

2. The RA method according to claim 1, further comprising:
    combining, by a terminal device, more preambles for transmitting a resource request having a higher priority level than the preambles used for transmitting a resource request having a lower priority level.

3. The RA method according to claim 1, further comprising:
    providing, by a terminal device transmitting a resource request with more than one preamble, a determined time and/or frequency shift between the preambles;
    wherein in case the determined time and/or frequency shift is zero, the preambles are provided with different signatures.

4. The RA method according to claim 1, further comprising:
    arranging, by a terminal device transmitting a resource request with more than one preamble, the preambles with at least a partial overlap in the time and/or frequency domain.

5. The RA method according to claim 1, further comprising:
    determining, by at least one terminal device, one or both of a number of preambles for transmitting a resource request with a determined priority level or a time and/or frequency shift between the number of preambles.

6. The RA method according to claim 5, further comprising:
    transmitting, by the at least one terminal device, the number of preambles and/or the time and/or frequency shift to the base station.

7. The RA method according to claim 5, wherein the time and/or frequency shift is predetermined or is determined based on a current network load and/or the available radio resources.

8. The RA method according to claim 1, further comprising:
    broadcasting, by the base station to the plurality of terminal devices, a determined time and/or frequency shift to be set between preambles of a resource request.

9. The RA method according to claim 1, further comprising:
    broadcasting, by the base station to the plurality of terminal devices, mapping information between numbers of preambles and priority levels of resource requests.

10. The RA method according to claim 1, wherein the detecting of the time or frequency shift between the at least two received preambles comprises:
    measuring, by the base station, the time or frequency shift between detected correlation peaks of the received preambles.

11. A base station, comprising:
    a receiver configured to receive a resource request from at least one of a plurality of terminal devices during one Random Access (RA) time slot, with the resource request including two or more preambles;
    a memory storage comprising instructions; and a processor in communication with the memory and with the receiver, wherein the processor executes the instructions to:
    detect a priority level of the resource request based on a number of preambles in the resource request;
    assign uplink resources according to the resource request and the priority level; detect at least one of a time or frequency shift between at least two received preambles; and
    determine whether the at least two received preambles are from a same terminal device or from different terminal devices, with the determining based on one or more of the detected time, frequency shift, or received power levels of the at least two received preambles.

12. The base station according to claim 11, wherein the processor further executes the instructions to broadcast, to the plurality of terminal devices, a determined time and/or frequency shift to be set between preambles of a resource request.

13. The base station according to claim 11, wherein the processor further executes the instructions to broadcast, to the plurality of terminal devices, mapping information between numbers of preambles and priority levels of resource requests.

14. The base station according to claim 11, wherein the detecting of the time or frequency shift between the at least two received preambles comprises measuring the time or frequency shift between detected correlation peaks of the received preambles.

* * * * *